United States Patent Office 3,366,135
Patented Jan. 30, 1968

3,366,135
VALVE OF MINIMUM THERMAL LEAK FOR HIGH TEMPERATURE AND LOW TEMPERATURE
Yoshihiro Ishizaki, Kamakura-shi, Japan, assignor to Kogyokaihatsu Kenkyusho, Tokyo, Japan
Filed Dec. 10, 1965, Ser. No. 512,953
Claims priority, application Japan, Dec. 18, 1964, 39/71,198
3 Claims. (Cl. 137—375)

This invention relates to a valve of minimum thermal leak for high temperature and low temperature.

FIG. 1 illustrates the conceptual structure of a valve for use at high and low temperatures in general, in which 19 is a body for normal temperature and the gap between this body and a pipe for fluid through which high temperature fluid or low temperature fluid flows is protected from heat with vacuum section 18.

Figure 1:
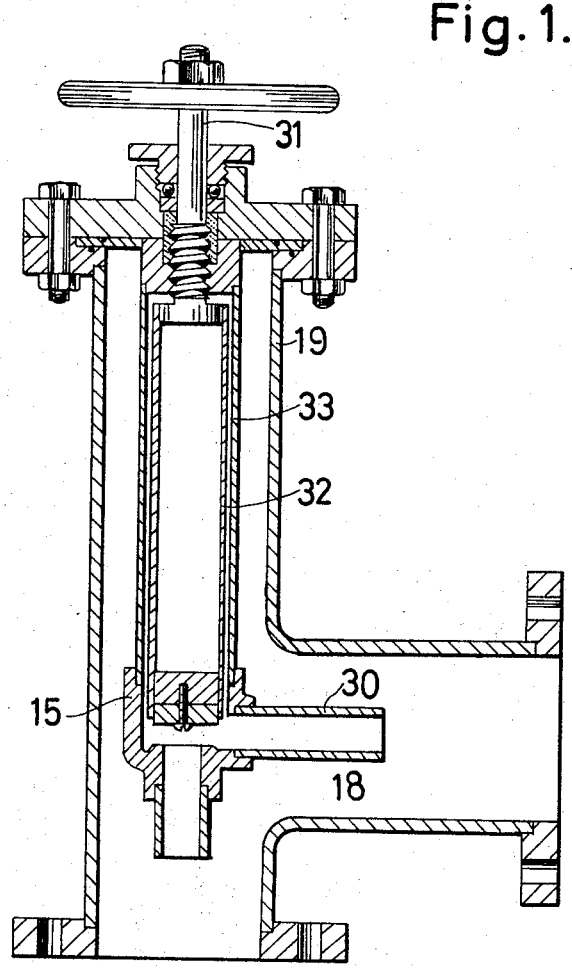
FIG. 1 illustrates the conceptual structure of a valve for high and low temperatures in general.

Consequently, heat loss that occurs when this valve is used results from shift of heat through the route from handle 31, stem 32, bonnet 33, valve seat 15 and to pipe 30. This heat loss can be calculated by the following Fourier's formua;

Heat Loss =

$$\frac{\text{Heat Conductivity} \times \text{Sectional Area} \times \text{Temperature Difference}}{\text{Length}}$$

Accordingly, in order to reduce heat loss, when the numerator in the above formula is constant, the lengths of the bonnet and the stem in the denominator must be elongated. To be more precise, in order to reduce the heat loss to ½, it is necessary to double the lengths of the bonnet and the stem. Thus the conventional valve has had such drawbacks as that the length of the valve itself cannot inevitably be shortened and the place of its application is limited, making it impossible that the valve is used either at high or low temperature.

Figure 2:
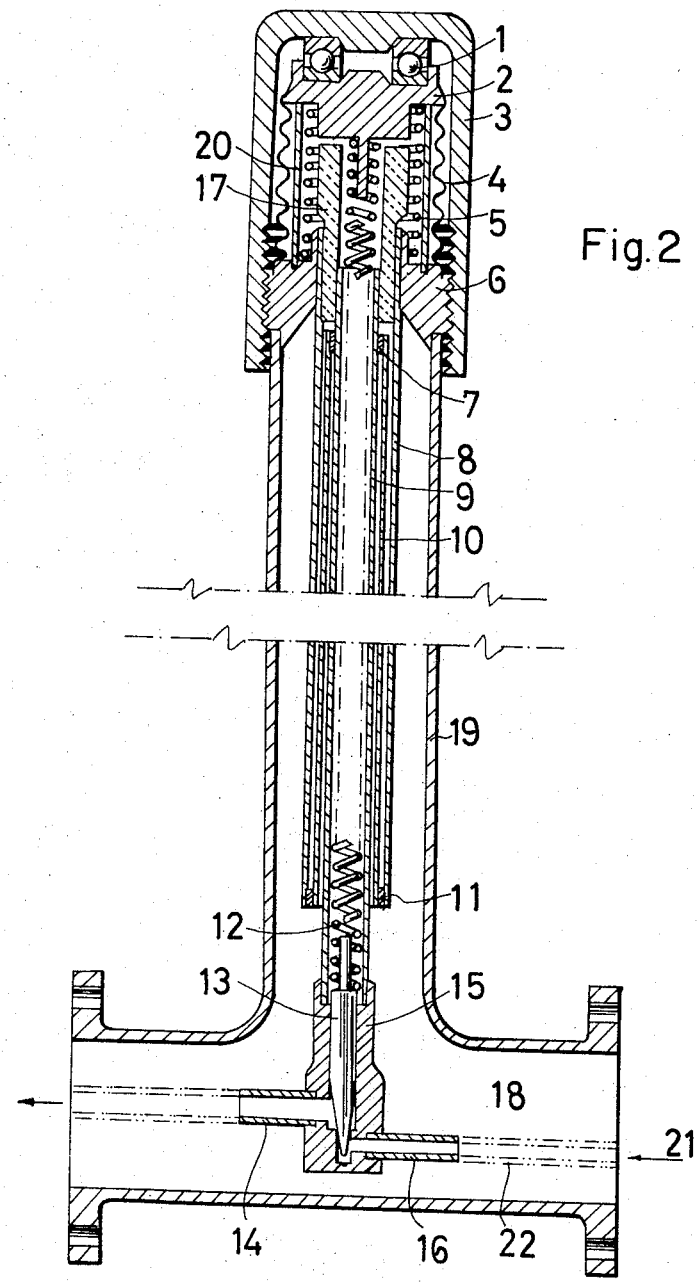
FIG. 2 and FIG. 3 are the schematical illustration of the valve of the present invention in operation.

The objective of the present invention is to provide a novel valve free from the above drawbacks. FIG. 2 illustrates the structure of the valve of the present invention in operation, and when the length of the valve is made equal to that of the conventional valve, the heat loss decreases to several times as less as that of the conventional valve.

Namely, 3 is a knob (a handle) finished with a knurling tool and this knob moves up and down when turned with the help of screw cut inside at its lower part. 1 is a thrust bearing which is placed between spring suppressor 2 and knob 3, and it makes spring suppressor 2 moving up and down without revolving along with the vertical motion of knob 3. A spiral structure type stem 12 is fixed to 2 as the stem of the valve, and fixed to the lower end of stem 12 is the end of the valve 13 which moves up and down inside of the main body of the valve seat 15 without revolving along with the vertical action of 2 to open and close the passage inside of valve seat 15 which is located between the pipe joint 14 and 16.

Nineteen is a body, the lower part of which flaps open to turn into a flange, while at the upper end of said body is fixed a spring stand 6 with screws cut at the outside and this screw matches with screws cut inside the lower part of knob 3. 4 is a bellows connecting 2 and 6 and it severs off the air by performing elongation and contraction along with the vertical action of spring suppressor 2, and 5 is a spring which pushes up spring suppressor 2 at any time. 20 is a stop ring which prevents 2 from excessive lowering when the valve is closed.

Next, the bonnet which surrounds the spiral structure type stem has a multi-pipe series structure with odd number of pipes with varied diameters connected in series at their upper and lower ends.

Namely, in FIG. 2 with three pipes for the bonnet, 8 has large diameter, 10 has medium diameter and 9 has small diameter. The lower end of pipe 9 is fixed to the main body of the valve seat 15 and its upper end is connected with the upper end of pipe 10 through the spacer 7, and the lower end of pipe 10 is connected with the lower end of pipe 8 by way of the spacer 11.

The upper end of pipe 8 is fixed to the spring stand 6 Thus, the pipes 8, 9 and 10 are connected in series with one another.

Fluid of high or low temperature 21 flows through the pipe 22 and 18 is a vacuum chamber for adiabatic purpose. Consequently, the heat loss of fluid 21 occurs by the route of 22, 16, 15 and 13 and then further through 12, 2, 1 and 3 to outside, while the other route is through 9, 10, 8 which are the multi-pipes series structure and then through 6 and 3 to outside.

In this case, the length in Fourier's formula per unit length of the valve can be extremely elongated since the stem 12 has a spiral structure and 8, 10 and 9 are connected in series, and, as a result, heat loss of stem 12 becomes very small.

Fluid 21 makes convection in the stem and the bonnet, reaching as far as the inside of bellows 4, but as the heat loss due to thermal conductivity becomes very small as described above, it becomes all the more important to take into consideration the heat loss due to this convection of the fluid.

Thus, it is desirous that thermal insulator such as glass wool is placed inside of pipe 9 for preventing the convection and further thermal insulator 17 such as urethane foam in the gap between the upper end of stem 12 and spring 5.

Figure 3:
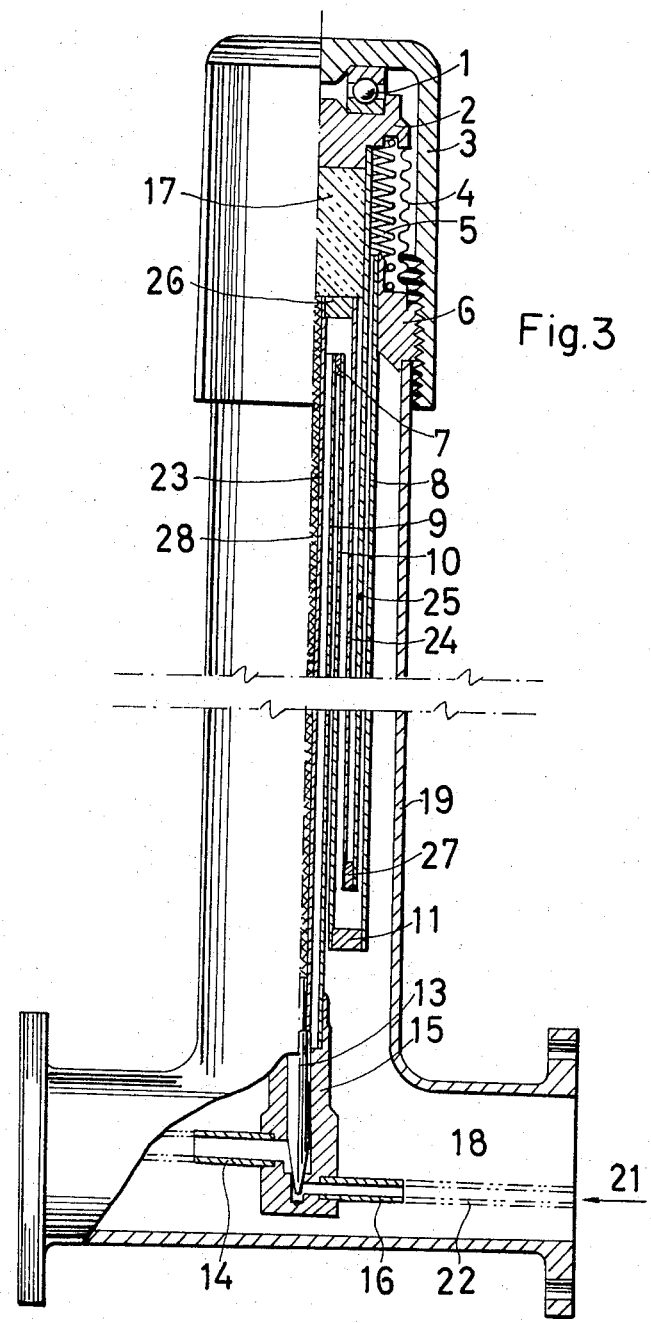

FIG. 3, shows another embodiment of the present invention, wherein the structure is almost the same as that in FIG. 2 except for the structure of the stem which possesses the multi-pipes series structure which is the same as that of the bonnet instead of the spiral type structure.

Namely, in FIG. 3 showing three pipes for the stem, pipe 25 has large diameter, 24 has medium and 23 has small diameter.

The lower end of pipe 23 is connected with the end of the valve 13 and its upper end is connected with the upper end of pipe 24 by way of a spacer 26, the lower end of pipe 24 is connected with the lower end of pipe 25 by way of a spacer 27 and the upper end of pipe 25 is fixed to a spring suppressor 2. Thus, the three pipes 23, 24 and 25 are connected in series. The structure of the bonnet is, similarly, of the multi-pipe series structure comprising the pipes 9, 10 and 8, and the diameters of the pipes for the stem and the pipes for the bonnet become small in the order of 8, 25, 24, 10, 9 and 23 and they are arranged in such a manner as 24 and 25 will fit inbetween 8 and 10, and 10 and 9 inbetween 24 and 23 alternately.

Also in this case, as the length in Fourier's formula per unit length of the valve can be elongated to a great extent, the heat loss of fluid 21 becomes very small as in FIG. 2. As in FIG. 2, it is desirous that such thermal insulator 28 as glass wool is inserted into the pipe 23 of the stem, and another thermal insulator 17 such as urethane foam is placed into inside of the upper end of the pipe 25 of the stem. The following table shows how small the heat loss is when the valve in FIG. 2 is used instead of the conventional valve at same body length.

| Items | Valve of present invention | Conventional valve |
|---|---|---|
| Length of body | 230 mm | 230 mm. |
| Height of stem | 180 mm | 180 mm. |
| Actual length of stem | 1,000 mm | 180 mm. |
| Height of bonnet | 180 mm | 180 mm. |
| Actual length of bonnet | 540 mm | 180 mm. |
| Low temperature fluid | Helium | Helium. |
| Low temperature | 4.2° K | 4.2° K. |
| Temperature of body | Normal temperature | Normal temperature. |
| Heat loss [1] | About 0.2 watt | About 1 watt. |

[1] Heat absorption in this case.

The above table clearly shows the significant effect of the present invention.

In this invention, the materials to be used for bonnet and stem which is formed with multi-pipe series structure of varied diameter pipe or spiral structure should preferably have smaller thermal conductivity, but, on the other hand, it is a matter of course that the material should be as thin as possible.

As described hereinbefore, according to the present invention, the transition of heat can be well checked as it passes through the bonnet the vertical reciprocating action is performed with the multi-pipe series structure, while it passes through the stem the spiral or the vertical reciprocating action is performed with the long spiral structure or the multi-pipe series structure as in the case of the bonnet, making it possible to manufacture a small type of a valve with extremely small heat loss (more than several times as small as that of the conventional valve).

Furthermore, as the structure itself is comparatively small, the manufacturing cost can be curtailed to a great extent.

It must be understood that the apparatus described above shows only two embodiments of the method of the invention and modifications can be carried out without departing from the scope of this invention.

What is claimed is:

1. A valve of minimum thermal leak for high temperature and low temperature characterized by the bonnet of the valve being in the form of a multi-pipe series structure in which an odd number of overlapping pipes of various diameters with both their corresponding ends connected in series.

2. According to claim 1, a valve of minimum thermal leak for high temperature and low temperature characterized by the stem of the valve being in the form of a multi-pipe series structure as in the case of the bonnet.

3. According to claim 1, a valve of minimum thermal leak for high temperature and low temperature characterized by the stem of the valve being in the form of a spiral structure as in the case of the bonnet.

References Cited
UNITED STATES PATENTS

| | | | |
|---|---|---|---|
| 858,100 | 6/1907 | Pedersen | 285—187 |
| 2,457,073 | 12/1948 | Steans | 285—187 XR |
| 3,146,005 | 8/1964 | Peyton | 285—47 |
| 3,150,679 | 9/1964 | Roubeau et al. | 137—375 |
| 3,275,345 | 9/1966 | Waldron et al. | 285—47 |

FOREIGN PATENTS

| | | |
|---|---|---|
| 1,249,396 | 11/1960 | France. |

HENRY T. KLINKSIEK, *Primary Examiner.*